Feb. 21, 1967  D. L. WATROUS ETAL  3,305,699
PROTECTIVE CIRCUIT FOR SUPERCONDUCTIVE LOADS
Filed March 8, 1965  3 Sheets-Sheet 1

Inventors:
Donald L. Watrous,
Stephen H. Minnich,
by Charles W Helzer
Their Attorney.

Inventors:
Donald L. Watrous,
Stephen H. Minnich,
by Charles W Helfer
Their Attorney.

Feb. 21, 1967  D. L. WATROUS ETAL  3,305,699
PROTECTIVE CIRCUIT FOR SUPERCONDUCTIVE LOADS
Filed March 8, 1965  3 Sheets-Sheet 3

Inventors:
Donald L. Watrous,
Stephen H. Minnich,
by Charles W. Helzer
Their Attorney.

United States Patent Office 3,305,699
Patented Feb. 21, 1967

3,305,699
PROTECTIVE CIRCUIT FOR SUPER-
CONDUCTIVE LOADS
Donald L. Watrous, Scotia, and Stephen H. Minnich,
Schenectady, N.Y., assignors to General Electric Company, a corportion of New York
Filed Mar. 8, 1965, Ser. No. 437,726
14 Claims. (Cl. 317—13)

This invention generally relates to a protective circuit for a superconductive load, and more particularly to a protective circuit for a superconductive coil.

"Superconduc*tive*" refers to materials which are used to fabricate electrical elements such as coils, and which can exhibit two levels of resistance. Under standard conditions a normal resistance exists; but if the material or element is subjected to an extremely low temperature in the neighborhood of 0° Kelvin, its resistance decreases to a substantially-zero value. "Superconduc*ting*" refers to this level of substantially-zero resistance. Therefore, the superconductive material or element has two possible operating modes: the normal or resistive mode, and the superconducting mode which exhibits a substantially-zero resistance.

Superconducting coils have a critical current which is dependent upon the material and the coil design. If this critical current is exceeded, a portion of the coil reverts to the normal mode thereby causing the magnetic field and current through the coil to decrease rapidly. Heat, generated by the current passing through the normal resistance portion, causes other portions of the coil to revert to the normal mode in a self propagating manner until the entire magnetic field energy is destroyed within the coil. Transition to a normal mode can also result if the temperature sustaining equipment should fail or if other factors are present. Unless the coil is protected, the energy stored therein will be dissipated as heat as the coil goes normal, and because superconducting currents are generally measured in the hundreds of amperes, heat generated by the local energy dissipation may be sufficient to damage the coil.

Unusually high currents and the extremely short time periods encountered in superconductive coil protection efforts render many known methods of superconductive coil protection ineffective. Three methods have been used to protect this type of circuit. A first method incoporates copper plating on the superconductor to provide a low resistance shunt path around the normal resistance portion. A second scheme utilizes magnetically-coupled circuits to prevent a rapid collapse of the flux and to absorb most of the energy in the coil. In a third method the coil is sub-divided, and a low resistance is connected in parallel with each of the subdivisions. These resistances short circuit any voltage developed across a subdivision having a normal resistance. However, the first scheme requires particular conductor structure while the second and third methods require intrinsic alteration in the coil design.

Accordingly, it is an object of this invention to provide a new protective circuit for superconductive coils.

It is another object of this invention to provide a circuit which minimizes coil damage caused by heat dissipation when the coil is de-energized .

It is another object of this invention to provide a protective circuit wherein energy stored in the superconductive coil is dissipated externally of the coil.

It is another object of this invention to provide a protective circuit wherein a transition to the normal mode is sensed and the superconductive coil de-energized without damage.

It is another object of this invention to provide a protective circuit wherein no intrinsic coil design alteration is required.

It is another object of this invention to provide a protective circuit which can be used to manually de-energize the superconductive coil without damage.

In practicing the invention, a protective circuit for a superconductive load is provided and is adapted to be connected across a source of electric potential. The protective circuit comprises a load current carrying fast acting electronic controlled conducting means having a conducting state, and a non-conducting state connected in series with the superconductive load across the power supply. Means are connected to the load current carrying fast acting electronic controlled conducting means to set this means to a conductive state. Means are provided to sense a current decrease in the superconductive load, and fast acting electronic controlled conducting commutating means are connected to the load current carrying means and to the sensing means to set the load current carrying means to a non-conducting state in response to a current decrease in the superconductive load. The protective circuit is completed by means connected in parallel with the superconductive load is dissipate energy stored therein so as to limit the voltage induced in the superconductive load upon the load current carrying means rendered non-conductive.

The above and still further features, objects and advantages of this invention will become apparent upon consideration of the following detailed description of a specific embodiment thereof, especially when taken in conjunction with the accompanying drawings; wherein similar parts in each of the several figures are given the same reference numeral, and wherein.

Figure 1:
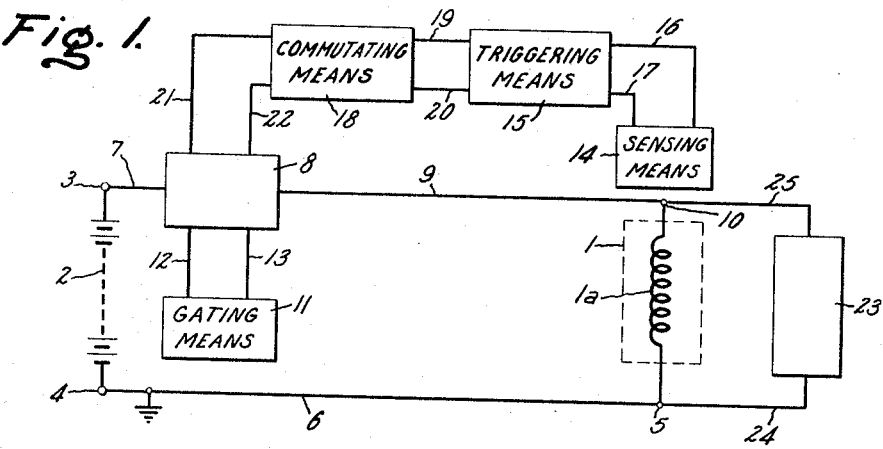
FIGURE 1 illustrates in diagrammatic form one embodiment of the protective circuit of this invention.
Figure 6:
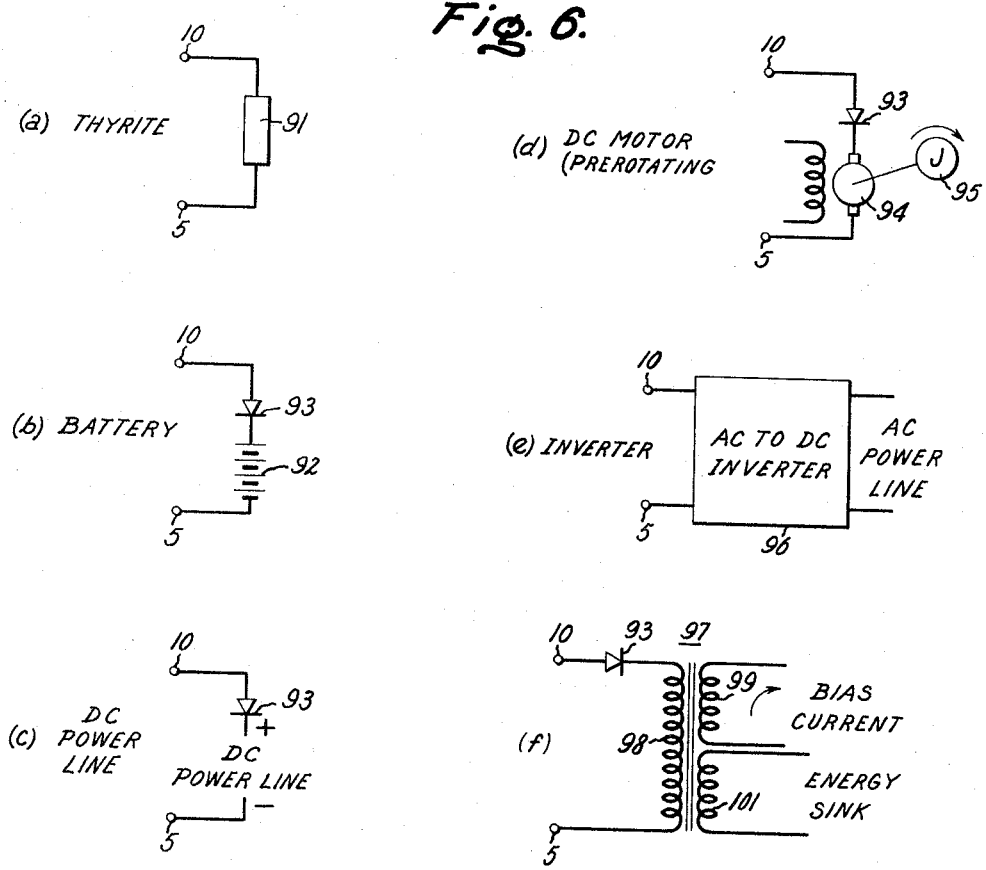
Figure 2:
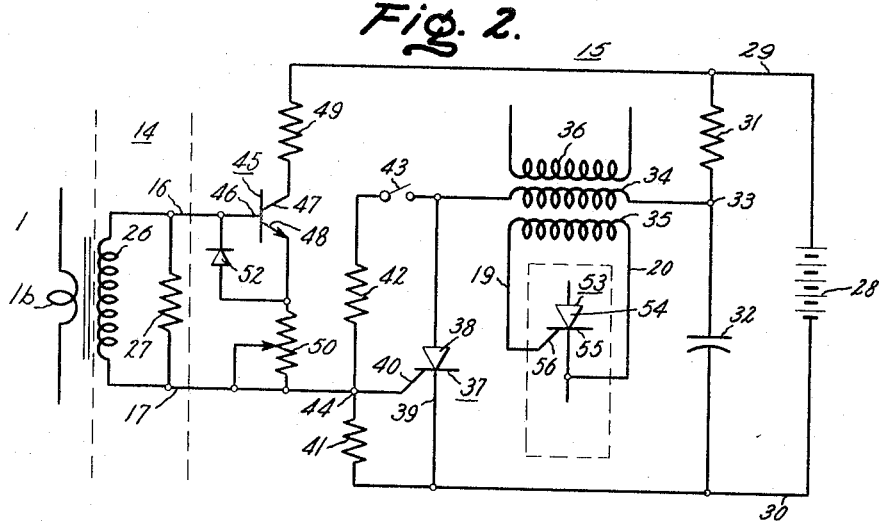
FIGURE 2 is a schematic diagram for one form of a sensor circuit and a trigger circuit suitable for use in the protective circuit of FIGURE 3.
Figure 5:
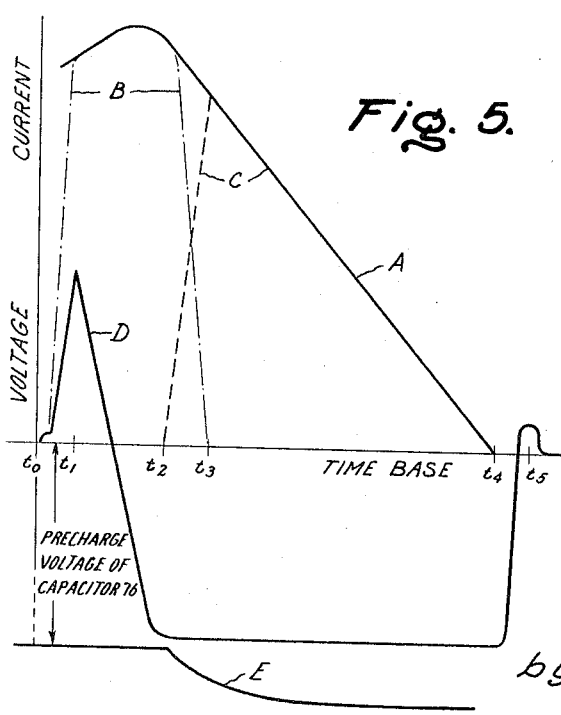

FIGURE 5 presents a graphical analysis illustrating certain of the operating characteristics of the protective circuit shown in FIGURE 2, and FIGURE 6 illustrates a number of different energy dissipation circuit schemes suitable for use with the invention. The new and improved protective circuit shown in FIGURE 1 is used to protect a superconductive load 1. A direct current power supply 2 which is a low voltage current source has a positive terminal 3 and a negative terminal 4 connected across the superconductive coil 1. The negative terminal 4 and a first load terminal 5 on the superconductive coil 1 are connected together by a grounded lead 6. A lead 7 connects the positive terminal 3 of the power supply to a first terminal of a load current carrying fast acting electronic controlled conducting means 8 having its remaining terminal connected through a lead 9 to a second load terminal 10 of the superconductive coil 1. The load current carrying fast acting electronic controlled conducting means 8 comprises a fast acting controlled conducting power semiconductor device such as a silicon controlled rectifier, a triac, or a power diac, or conceivably could comprise a gas discharge tube such as a three electrode gap, a mercury arc rectifier or a thyratron. Preferably, however, the load current carrying means comprises a power semiconductor device such as a silicon controlled rectifier having a gating means 11 connected through the leads 12 and 13 for turning the device on and causing it to operate in its conducting state. A sensing means 14 is operatively associated with the superconductive coil 1 for deriving a triggering signal in the event that the superconductive coil 1 tends to go normal. The output signal derived by sensing means 14 is connected through leads 16 and 17 to a trigger circuit means 15 having its output connected through leads 19 and 20 to a commutating circuit means 18. Commutating circuit means 18 in turn has its output connected through leads 21 and 22 across the load current carrying fast acting electronic controlled conducting means 8 for commutating load current carrying means 8 off upon the sensing means 14 developing an output triggering signal. An energy dissipation circuit 23 (sometimes referred to as an energy sink) is connected through leads 24 and 25 across the load terminals 5 and 10 of superconductive coil 1.

Briefly, the operation of the new and improved protective circuit is initiated by the gating means 11 causing the load current carrying controlled conducting means 8 to be rendered conductive thereby supplying current flow through the superconductive coil 1. If during the operation of the coil, any portion of the coil tends to go normal so that its resistance increases as discussed above, the current through the coil will decrease rapidly, and this rapid decrease in current is sensed by the sensing circuit means 14. The sensing circuit means 14 then triggers the trigger circuit means 15 which actuates the commutating circuit means 18, and results in commutating off the load current carrying controlled conducting means 8. This action results in open circuiting the power supply connection to the superconducting coil 1 which then must dissipate the energy trapped therein as a consequence of the open circuiting action. For this purpose, the energy dissipation circuit 23 is provided so that instantaneously with the turning off of the load current carrying controlled conducting means 8, energy trapped in the superconductive coil 1 will be transferred to the energy dissipation circuit 23. The energy dissipation circuit then serves to control both the current decrease through the superconductive coil 1 as well as to control the voltage induced thereby across the coil 1 by the energy dissipation circuit 23 itself until the current through the coil is reduced to zero value.

In order to illustrate more clearly the operation of the new and improved protective circuit, one specific form of the circuit has been disclosed in FIGURES 2 and 3, and will be discussed in detail hereinafter.

FIGURE 1 shows the construction of a sensor circuit 14 and the trigger circuit 15. The sensor circuit 14 comprises a multi-turn winding 26 and a sensor resistor 27 in parallel. The multi-turn winding 26 is wrapped about a toroidal core to act as a secondary winding, and it is disposed adjacent to said superconductive coil 1 load current leads in inductive relationship. Winding 26 has a voltage induced therein by a charge in the current flowing in coil 1 which acts as the mutual inductor primary. In this particular sensor circuit, the multi-turn winding 26 and the sensor resistor 27 are connected to the leads 16 and 17 so that a sudden decrease of the current in the superconductive coil 1 causes a positive voltage at the lead 16 with respect to the lead 17.

The trigger circuit 15 generally comprises a trigger relaxation oscillator which is energized by a second D.C. power supply 28 having a positive lead 29 and a negative lead 30. A resistor 31 and a trigger capacitor 32, in series between leads 29 and 30, form a first junction 33 therebetween. To provide a discharge path for the trigger capacitor 32, a transformer primary 34 and a silicon controlled rectifier (SCR) 37 are connected in series between the first junction 33 and the negative lead 30. A first secondary winding 35 and a second secondary winding 36 are inductively coupled with the transformer primary 34. The SCR anode 38 is connected to the transformer primary 34; the cathode 39, to the negative lead 30; and the gate 40, to a firing circuit.

Resistors 41 and 42 and a switch 43 in series provide a manual firing circuit for SCR 37 and are disposed between the anode 38 and the cathode 39 thereof. Junction 44 of the voltage divider formed by the resistors 41 and 42 is connected to the gate 40 of SCR 39 and serves to develop a firing signal for the SCR 37.

Automatic firing is controlled by a transistor 45. Its base 46 is connected to the lead 16 from the sensor circuit 14; its collector 47 is connected to the positive lead 29 from power source 28 through a limiting resistor 49; and the emitter 48 of transistor is connected to the lead 17 from the sensor circuit 14 through a variable resistor 50. The circuit is completed by connecting the lead 17 to the junction 44 of voltage dividing resistors 41 and 42 and by placing a clamping diode 52 between the base and emitter of the transistor 45.

In order to control the conduction of a commutating SCR 53, the first secondary winding 35 of the transformer 34 is connected across the gate 56 and cathode 55 of commutating SCR 53 by leads 19 and 20, respectively.

The commutating SCR 53, shown in FIGURE 2, also forms an integral part of the second switch operator 18 of the protective circuit shown in FIGURE 1. The details of construction of the second switch operator 18 are illustrated in FIGURE 3 which shows a commutating SCR anode 54 connected to the positive terminal 3 of the first D.C. power supply 2 by leads 21 and 7. Cathode 55 of SCR 54 is connected to a first terminal of a saturable inductor 57 having its remaining terminal connected to a junction 58. Junction 58 also is connected to one plate of a commutating capacitor 59 and is connected through limiting resistor 61 to a source of negative potential 60. The remaining plate of the commutating capacitor 59 is connected to the lead 22 from the switch 8.

Switch 8 comprises a plurality of load current carrying, controlled conducting power semiconductor devices. These devices are preferably SCR's connected in parallel, the number of SCR's being dependent upon their load current rating and the magnitude of the superconducting current flowing in coil 1. In the specific embodiment shown, a first load SCR 62 is disposed in series with the superconductive coil 1 by connecting anode 63 to the lead 7 from the positive terminal 3 and the cathode 64 to the lead 9 from the second load terminal 10. The gate 65 is connected to lead 12 from the first switch operator 11 by a first gate resistor 66. A first balancing resistor 67, shown in the anode circuit of the SCR 62, is constituted by the resistance of the circuit hook-up cable. A second load SCR 68, having an anode 69, a cathode 70 and a gate 71, is placed in parallel with the first load SCR 62 and has a second gate resistor 72 and a second balancing resistor 73. The switch 8 thus comprised is connected to the power supply 2 by lead 7, to the load terminal 10 by lead 9, to the first switch operator 11 by leads 12 and 13, and to the second switch operator 18 by leads 21 and 22.

The first switch operator 11 comprises a third D.C. power supply 74 and a switch 75 connected to the switch 8 by leads 12 and 13. The third D.C. power supply 74 is poled so that closure of the switch 75 will trigger on the load SCR's 62 and 68.

In one form of the invention, the energy dissipation circuit 23 comprises a precharged dissipation capacitor 76 and diodes 77 and 78 in a series circuit relationship across the load terminals 5 and 10 of superconductive coil 1. A second source of negative potential 79 is connected to a fourth junction 80 formed by the dissipation capacitor 76 and the anode of diode 77 by means of a series limiting resistor 81 to thereby precharge the dissipation capacitor 76.

A resistor 82 and a capacitor 83 are used in conjunction with the energy dissipation circuit 23 to form an optional portion of the protective circuit. When the resistor 82 and the capacitor 83 are included, they are connected in series between the leads 21 and 22 to form a suppression filter.

Figure 3:
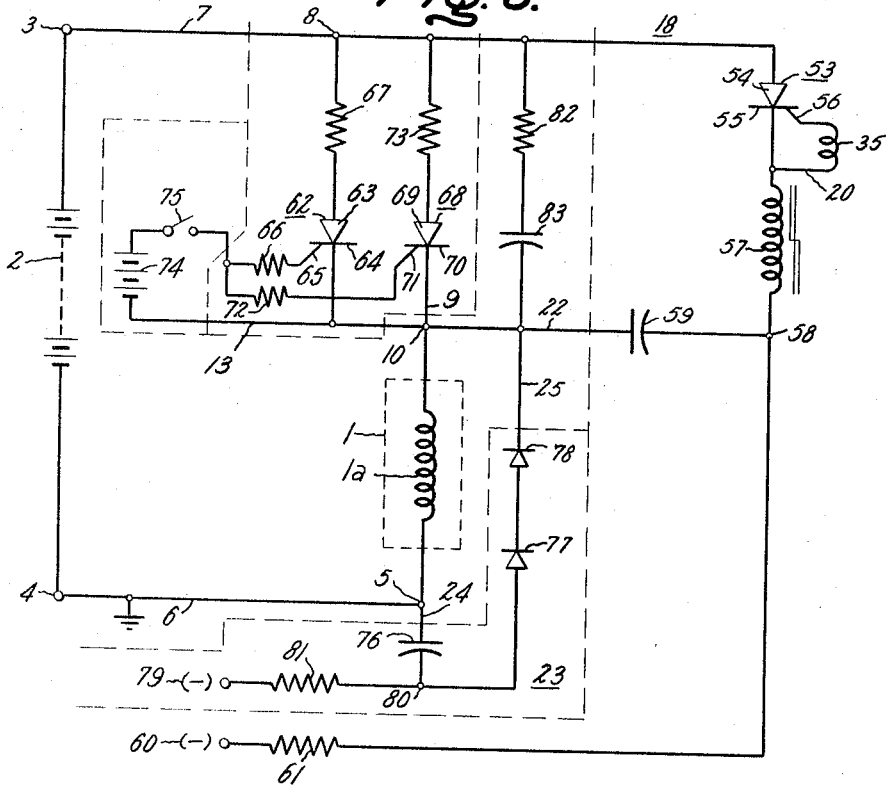
FIGURE 3 is a detailed schematic circuit diagram of one form of protective circuit constructed in accordance with the invention.

In order to discuss the operation of this protective circuit, reference is made to FIGURES 1 through 3 and 5. It is assumed that initially a quiescent state exists wherein the load SCR's 62 and 68 are non-conducting and that the superconductive coil 1 is in an environment which supports a superconducting state. Additionally it is assumed that the capacitors 32 in FIGURE 2, and capacitors 59 and 76 in FIGURE 3 are fully charged.

Under these conditions momentary closure of switch 75 triggers the load SCR's 62 and 68 simultaneously, and a current flows through the superconducting coil 1. Current balance in the load SCR's is obtained by varying the first and second balancing resistors 67 and 73. During a transient period when the current increases to superconducting value, a negative signal or reverse transient, is applied to the base 46 of transistor 45 by the sensor circuit 14. The reverse transient signal which appears between the base 46 and the emitter 48 is an extremely high voltage, and protection during these reverse transients is afforded by the clamping diode 52 which acts as a short circuit to the reverse transient voltage.

Manual de-energization is initiated by closure of the switch 43 in FIGURE 2 thereby firing the trigger SCR 37. Automatic operation is initiated by a decrease in the load current which is converted to a positive signal at the base 46 of transistor 45 by the sensor circuit 14. The signal magnitude which turns on the transistor 45 is set by the potentiometer 50. Current flow through the transistor 45 causes the gate-cathode voltage on the trigger SCR 37 to increase until it fires. Upon SCR 37 being turned on by either method, the trigger capacitor 32 discharges through the transformer primary 34 and the trigger SCR 37. This discharge produces an output signal in both the first and second secondary windings 35 and 36 associated with transformer primary winding 34. The second secondary winding 36 is optional, it can be used to initiate the operation of associated circuits or instrumentation. The output signal on the secondary winding 35 is applied to the gate of the commutating SCR 53 in FIGURE 3.

In the following discussion, current flowing through the superconductive coil 1 is designated as load current. Current through the commutating SCR 53 is called commutating circuit current. Current which flows through the diodes 77 and 78 is defined as diode current.

While the load SCR's 62 and 68 are conducting and before the commutating SCR 53 is triggered, a charge is built up across the commutating capacitor 59 which is substantially equal to the value of the supply potential 60. Upon firing the commutating SCR 53, the capacitor voltage is essentially applied instantaneously across the saturable inductor 57. As the saturable inductor 57 is not saturated at the time, it will hold off the voltage of commutating capacitor 59 to allow the current through the SCR 53 initially to build up slowly. When the saturable inductor 57 does saturate, the charged commutating capacitor 59 is placed in parallel across the load SCR's 62 and 68 with the negative electrode of the commutating capacitor 59 connected through the saturated inductor 57 and the commutating SCR 53 to the anodes 63 and 69, while the positive electrode is connected to the cathodes 64 and 70. The voltage on the charged commutating capacitor 59 is thereby impressed across the load SCR's 62 and 68, in a reverse polarity relation. As a result, the potential of the cathodes is driven above the potential of the anodes and the SCR's turn off.

As the load SCR's 62 and 68 are turned off, the current passing therethrough decreases rapidly, while the commutating circuit current increases so that the load current tends to remain constant, except for the effect of the inductive voltage spike that occurs at the onset of the commutation interval. When the load SCR's 62 and 68 have ceased to conduct, the entire load current passes through the commutating SCR 53, the saturable inductor 57 and the commutating capacitor 59.

Referring to FIGURE 5, it is noted in the graphical analysis that the load current increases slightly as shown by curve A due to the discharge of commutating capacitor 59. The voltage at the second load terminal 10 reaches a positive peak as shown by curve D when the entire commutating capacitor voltage is applied across the load SCR's 62 and 68. During the period from $t_1$ to $t_2$, the entire load current passes through the commutating SCR 53, the saturated inductor 57 and the commutating capacitor 59. No voltage is induced in the saturable inductor 57 because it is saturated. This load current charges the commutating capacitor 59 so that the second load terminal 10 tends to go negative with respect to the junction 58. As the commutating SCR 53 and the saturable inductor 57 offer substantially no impedance, the junction 58 is at approximately ground potential because the first D.C. power supply 2 is a low voltage source. At $t_2$, the voltage at junction 10 is negative with respect to junction 80 so that diodes 77 and 78 start to conduct. At this point in time the potential of junction 10 is clamped to the potential of junction 80. During the time from $t_2$ to $t_3$ the load current transfers from capacitor 59 to diodes 77 and 78 as shown by curves B and C.

At $t_3$ the commutating circuit current reaches zero, and the coil 1 transfers its energy to the energy dissipation capacitor 76 until all the energy in the superconductive coil 1 is transferred. When the energy transfer is complete, load current reaches zero and the transient inductive voltage dissappears abruptly. The potential at the second load terminal 10 returns essentially to D.C. ground potential. Subsequently, the energy dissipation capacitor 76 discharges through the second limiting resistor 81 to the second source of negative potential 79.

As mentioned above at time $t_2$, the potential of junction 10 is clamped to the potential of junction 80. During time $t_2$ to $t_3$, concurrently with the above described action, energy in the saturated inductance 57 transfers to capacitor 59. When this transfer of energy to capacitor 59 is complete, and current through inductor 57 reaches zero, the potential of junction 58 is above the potential of the anode of commutating SCR 53, and SCR 53 turns off. Thereafter, the commutating capacitor 59 is recharged to the proper polarity and value through resistor 61 from the first source of negative potential 60. One cycle of operation of the protective circuit is then complete, and the circuit is conditioned for a new cycle of operation if required.

Inherent capacitance in the superconductive coil during the rapid decrease in load voltage at time $t_4$ tends to cause load oscillations in the circuit. The suppression filter, constituted by the resistor 82 and the capacitor 83, damp these load oscillations to make their effect negligible.

Figure 4:
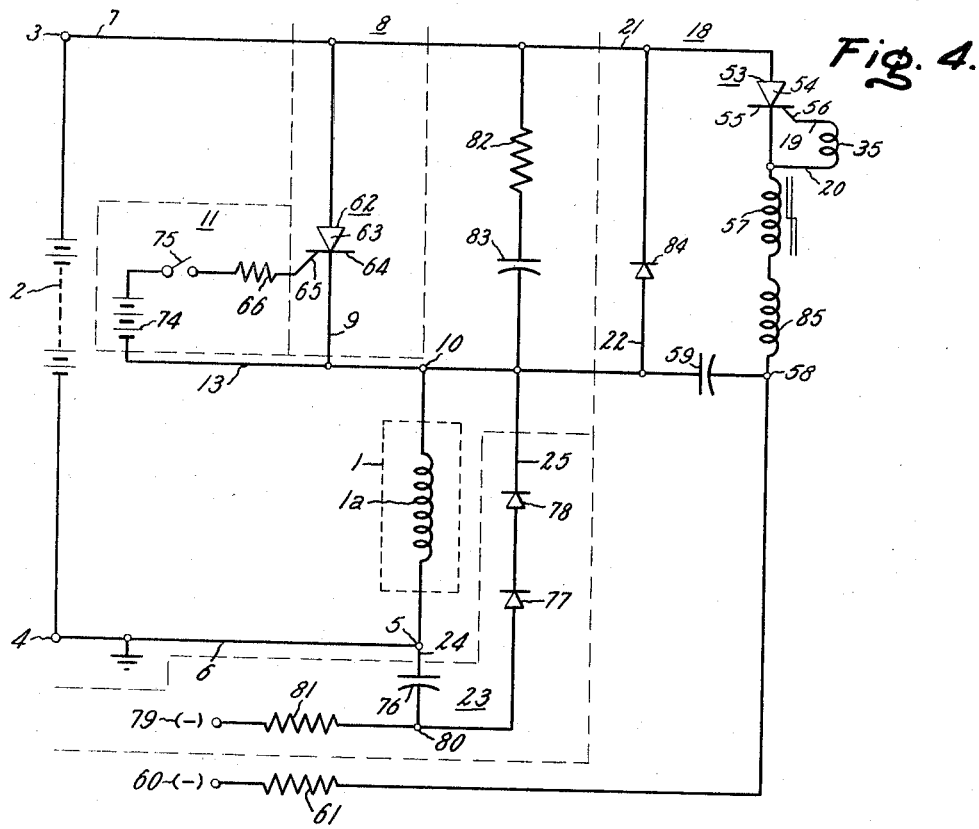
FIGURE 4 illustrates a schematic diagram of an improved form of protective circuit constructed in accordance with the invention.

The second D.C. static switching circuit shown in FIGURE 4 eliminates the undesired voltage spike at the onset of the commutation interval discussed in conjunction with FIGURES 3 and 5. Changes from the circuit shown in FIGURE 3 include elimination of the load SCR 68 and the addition of a diode 84 and a linear inductor 85. The diode 84 is connected between the lead 21 and a positive terminal 86 of the commutating capacitor 59 so that it conducts current from the positive terminal 86 to the lead 21. The linear inductor 85 is connected in series between the saturable inductor 57 and the junction 58 and forms a resonant circuit with the commutating capacitor 59.

With the circuit shown in FIGURE 3, a voltage spike was applied to the superconductive coil at the beginning of the commutation of the load SCR's. With the linear inductor 85 and diode 84 added, this commutating voltage spike is eliminated.

FIGURE 6 of the drawings illustrates schematically a number of different types of suitable energy dissipation circuits or energy sinks that can be used in conjunction with the new and improved protective circuit comprising the present invention. As can be readily determined, the embodiments of the invention shown in FIGURES 3 and 4 employ a precharged capacitor 76 which by its nature permits easy adjustment of the voltage that develops across the superconducting coil 1 as it is allowed to discharge into the energy sink. The desired action is to transfer the stored energy in the superconductive coil to the energy sink in a minimum amount of time. In addition, this must be accomplished within the voltage limitations of the superconductive coil and of the static switch employed to accomplish the protective action. If there is a given maximum voltage to which the superconductive coil, or the static switch can be subjected, maximum utilization of the energy sink employed will be obtained if that voltage is used for all of the time interval required for the transfer of energy out of the superconductive coil into the energy sink rather than at only the beginning or end of the transfer period. Employment of a precharged capacitor in the manner illustrated in FIGURES 2 and 3 of the drawings, allows this maximum utilizable voltage to be adjusted readily for a particular superconducting coil being protected, and to allow for the capabilities of the static switch employed. The capacitor size employed in the energy sink is a function of the total energy to be stored and the voltage that can be allowed to develop across the superconductive coil during the transfer period. To satisfy these requirements, the capacitor employed generally must store several times the coil energy dependent on how constant the voltage developed across the sink must be maintained.

FIGURE 6(a) illustrates still a different type of suitable energy sink which is in the form of a simple, nonlinear resistor 91 such as a Thyrite resistor. If an appropriate Thyrite resistor 91 is employed, the voltage developed across the superconducting coil will be maintained at approximately a constant value during the period that energy is being transferred from the coil to the Thyrite resistor. However, because the coil voltage cannot be maintained precisely constant, the resulting variation in coil current generally requires about a 20% longer time period to effectively transfer all of the energy out of the superconducting coil into the Thyrite energy sink. With an energy sink formed from a Thyrite resistor, all of the coil energy is converted directly into heat. Since the energy must be transferred in a very short time period (on the order of a few milliseconds), the Thyrite resistor must have enough capacity to store the heat without reaching an excessive temperature.

FIGURE 6(b) illustrates still a different form of energy sink for use with the invention. The energy sink shown in FIGURE 6(c) comprises a conventional storage battery 92 connected in series circuit relationship with a coupling diode 93. Similar to the precharged capacitor, the storage battery 92 must have a storage capacity which is appreciably larger than the energy of the superconducting coil with which it is used. The storage capacity of the battery is generally determined by the internal impedance of the battery, as well as its ability to accept a very high rate of charge. It should be noted, however, that the battery forms an excellent energy sink where it is essential that the voltage developed across the superconducting coil be held at a relatively constant value during the transfer of energy into the energy sink. In place of the storage battery 92, it would be possible to employ a suitable direct current power line as shown in FIGURE 6(c) of the drawings as a suitable energy sink. Here again it would be necessary to employ a coupling diode 93, and it would be necessary that the voltage of the D.C. power line employed be maintained at a relatively constant value.

Where very large superconducting coils are to be protected, an arrangement such as shown in FIGURE 6(d) of the drawings might be used. In FIGURE 6(d), a direct current motor shown at 94 is employed as the energy sink, and has its rotor winding coupling through a coupling diode 93 across the superconducting coil to be protected. With this arrangement, it is then possible to accelerate a load such as shown at 95 with the energy transferred from the superconductive coil thereby converting the energy into mechanical inertia. The sink voltage can be predetermined by idling the D.C. motor 94 at a pre-set proper speed and field excitation.

A more efficient scheme for utilization of the energy of the superconducting coil is illustrated in FIGURE 6(e) of the drawings. In the arrangement of FIGURE 6(e), a direct current to alternating current inverter circuit 96 is coupled across the load terminals of the superconductive coil. Such D.C.-A.C. inverters are now commercially available and perform the function of converting direct current to alternating current power. Many of these inverters are also capable of performing the reverse process of converting alternating current power into direct current power. Accordingly, with the scheme shown in FIGURE 6(e) of the drawings, it would be possible to employ the inverter 96 as as rectifier to charge the superconducting coil from an A.C. line while the coil is properly operating in its superconducting mode. Then in the event the coil tends to go normal, and it is necessary to employ the protective circuit for protection to the coil, the D.C. to A.C. inverter 96 could be employed as the energy sink to transfer the energy from the superconducting coil back into the A.C. power line. By this arrangement then, efficient utilization of the energy stored in the coil can be achieved.

FIGURE 6(f) of the drawings illustrates a means for readily matching the voltage requirements of any given superconducting coil to an available energy sink. With the arrangement shown in FIGURE 6(f), a bias transformer 97 is employed intermediate the coil to be protected and the energy sink. The transformer 97 has its primary winding 98 coupled through a coupling diode 93 across the superconductive coil to be protected, and has a bias winding 99 coupled to a source of suitable biasing current so that the transformer can be biased to negative saturation preferably with only a relatively weak magneto-motive-force field. In addition to the bias winding 19, a secondary winding 101 is employed which is coupled across a suitable energy dissipation device such as a Thyrite resistor similar to the one shown in FIGURE 6(a). By this arrangement then, it is possible to match the desired superconducting coil voltage to the voltage of the available energy sink rather well. It is necessary that the transformer employed have a volt-second rating greater than that employed by the coil discharge; however, by the proper choice of turn ratio, a fixed voltage Thyrite resistor employed as the energy sink can be matched to several different coil voltages merely by varying the turns ratio of the transformer 97.

Having described several embodiments of a new and improved protective circuit for superconducting coils, as well as several different forms of energy sinks suitable for use with such protective circuits, it can be appreciated that the invention makes available protecting means which minimize superconducting coil damage caused by heat dissipation where the coil tends to go normal. This is achieved by the protective circuit which dissipates the energy stored in the superconductive coil externally of the coil and externally of the superconductive environment in which the coil is employed. As a consequence, such coils can be rapidly de-energized without damage, and without requiring protective measures wherein intrinsic coil design alteration is required.

Having described several embodiments of new and improved protective circuits constructed in accordance with the invention, it is believed obvious that other modifications and variations of the invention are possible in light of the above teachings. It is therefore to be understood that changes may be made in the particular embodiments of the invention described which are within the full and intended scope of the invention as defined by the appended claims.

What is claimed as new and desire to be secured by Letters Patent of the United States is:

1. A protective circuit for a superconductive load adapted to be connected to a source of electric potential and energized thereby comprising:
- (a) load current carrying fast acting electronic controlled conducting means having a conducting state and a non-conducting state, connected in series with said superconductive load and the power supply;
- (b) means connected to the load current carrying fast acting electronic controlled conducting means to set said means to a conductive state;
- (c) means to sense a current decrease in said superconductive load;
- (d) fast acting electron controlled conducting commutating means connected to said load current carrying means and connected to and contolled by said sensing means to set said load current carrying means to a non-conducting state, and
- (e) means connected in parallel with said superconductive load to dissipate energy stored therein so as to limit the voltage induced in said superconductive load upon the load current carrying means being rendered non-conductive.

2. A protective circuit for a superconductive coil adapted to be connected to a source of electric potential and energized thereby comprising:
- (a) a fast acting controlled conducting power semiconductor device connected in series with said superconductive coil and the power supply;
- (b) means for initiating conduction through said load semiconductor device and said superconductive coil;
- (c) a commutating circuit in parallel with said load semiconductor device for commutating the load semiconductor device off;
- (d) a trigger circuit connected to said commutating circuit to initiate operation thereof;
- (e) a sensor circuit operatively coupled to said superconductive coil and connected to said trigger circuit to actuate said trigger circuit in response to a current decrease in said superconductive coil, and
- (f) means connected in parallel with said superconductive coil to dissipate energy stored therein to limit the voltage induced in said superconductive coil upon the load semiconductor device being commutated off.

3. The combination set forth in claim 2 wherein the energy dissipation means comprises a Thyrite resistor.

4. The combination set forth in claim 2 wherein the energy dissipation means comprises a battery and a coupling diode connected in series.

5. The combination set forth in claim 2 wherein the energy dissipation means comprises a direct current motor having its rotor winding connected in series circuit relationship with a coupling diode.

6. The combination set forth in claim 2 wherein the energy dissipation means comprises a direct current to alternating current inverter.

7. The combination set forth in claim 2 wherein a voltage matching transformer is interposed in the circuit intermediate the superconductive coil and the energy dissipation means.

8. The combination set forth in claim 2 wherein the energy dissipation means comprises a direct current power supply and a coupling diode connected in series with the diode opposing current flow from said power supply.

9. A protective circuit as set forth in claim 2 wherein a plurality of load power semiconductor devices are connected in parallel between the power supply and said superconductive coil and wherein means are connected in series with each of said power semiconductor devices to balance the current therebetween.

10. A protective circuit for a superconductive coil adapted to be connected to a D.C. power supply and energized thereby comprising:
- (a) a load SCR, having a gate, a cathode and an anode, connected in series with said superconductive coil and the power supply;
- (b) means to apply a pulse to said gate to initiate conduction through said load SCR and said superconductive coil;
- (c) a commutating circuit in parallel with said load SCR, said commutating circuit including a commutating SCR having a gate, a cathode and an anode for commutating off said load SCR;
- (d) a trigger circuit connected to said commutating SCR gate and cathode to trigger said commutating SCR on and thereby terminate conduction through said load SCR;
- (e) a sensor circuit connected to said trigger circuit to actuate said trigger circuit in response to a current decrease in said superconductive coil; and
- (f) means connected in parallel with said superconductive coil to dissipate energy stored therein to limit the voltage induced in said superconductive coil upon the load SCR being commutated off.

11. A protective circuit for a superconductive coil adapted to be connected to a D.C. power supply and energized thereby comprising:
- (a) a load SCR, having a gate, a cathode and an anode, connected in series with said superconductive coil and the power supply;
- (b) means to apply a pulse to said gate to initiate conduction through said load SCR and said superconductive coil;
- (c) a commutating circuit in parallel with said load SCR, said commutating circuit including a commutating SCR having a gate, a cathode and an anode for commutating off said load SCR;
- (d) a trigger circuit having an input and an output, said output being connected to said commutating SCR gate and cathode to initiate conduction of said commutating SCR;
- (e) a sensor circuit connected to said trigger circuit input, said sensor circuit including a mutual inductance and a resistor in parallel, said mutual inductance being disposed adjacent to said superconductive coil to actuate said trigger circuit in response to a current decrease in said superconductive coil; and
- (f) means connected in parallel with said superconductive coil to dissipate energy stored therein to limit the voltage induced in said superconductive coil upon the load SCR being commutated off.

12. A protective circuit for a superconductive coil adapted to be connected to a D.C. power supply and energized thereby comprising:
- (a) a load SCR, having a gate, a cathode and an anode, connected in series with said superconductive coil and the power supply;
- (b) means to apply a pulse to said gate to initiate conduction through said load SCR and said superconductive coil;
- (c) a commutating circuit in parallel with said load SCR for commutating off said load SCR;
- (d) a trigger circuit connected to said commutating circuit to initiate operation thereof;
- (e) a sensor circuit connected to said trigger circuit to actuate said trigger circuit in response to a current decrease in said superconductive coil; and
- (f) a dissipation capacitor and a rectifier circuit in parallel with said superconductive coil and poled so as to block current during the superconductive state, and means to charge said capacitor, said commutating circuit initially conducting current subsequent to commutation of said load SCR to bias said dissipation capacitor and rectifier circuit to a conducting state so the energy stored in said superconductive coil is transferred to said dissipation capacitor.

13. A protective circuit for a superconductive coil adapted to be connected to a first D.C. power supply and energized thereby comprising:
- (a) a load SCR having a gate, a cathode connected to a first terminal of said superconductive coil and an anode connected to a positive terminal of the first D.C. power supply;

(b) a gate circuit connected to said load SCR, said gate circuit comprising a resistor and a switch connected in series between said gate and cathode and adapted to be energized by a second D.C. power supply so that closure of said switch causes said load SCR to fire;

(c) a commutating circuit connected to said load SCR for commutating off said load SCR, said commutating circuit including a commutating SCR having a gate, a cathode and an anode, said anode being connected to the positive terminal of the first D.C. power supply, a saturable inductance having a first terminal connected to said commutating SCR cathode, a commutating capacitor connected between said load SCR cathode and a second terminal of said saturable inductance and means to charge said commutating capacitor;

(d) a trigger circuit connected to said commutating circuit, said trigger circuit including:
   (1) a resistor and a trigger capacitor in series and adapted to be energized by a third D.C. power supply to charge said trigger capacitor,
   (2) a transformer having a primary and a secondary,
   (3) a first terminal of said primary being connected to a first terminal of said trigger capacitor,
   (4) switching means to connect a second terminal of said primary to a second terminal of said trigger capacitor to discharge said trigger capacitor through said primary, and
   (5) said secondary being connected to said commutating circuit to actuate said commutating circuit in response to a discharge of said trigger capacitor;

(e) a sensor circuit connected to said trigger circuit switching means, said sensor circuit including a mutual inductance and a second resistor in parallel, said mutual inductance being disposed adjacent to said superconductive coil to actuate said trigger circuit switching means in response to a current decrease in said superconductive coil; and (f) a dissipation capacitor and a rectifier circuit in parallel with said superconductive coil and poled so as to block current during the superconducting stage, and means to charge said capacitor, said commutating circuit initially conducting current subsequent to the commutating of said load SCR to bias said dissipation capacitor and rectifier circuit to a conducting state so the energy stored in said superconductive coil is transferred to said dissipation capacitor.

14. A protective circuit for a superconductive coil adapted to be connected to a first D.C. power supply and energized thereby comprising:

(a) a load SCR, having a gate, a cathode connected to a first terminal of said superconductive coil, and an anode connected to a positive terminal of the first D.C. power supply;

(b) a gate circuit connected to said load SCR, said gate circuit comprising a resistor and a switch connected in series between said load SCR gate and cathode and adapted to be energized by a second D.C. power supply so that closure of said switch causes said load SCR to fire;

(c) a commutating circuit connected to said load SCR for commutating off said load SCR, said commutating circuit including a commutating SCR having a gate, a cathode and an anode, said anode connected to the positive terminal of the first D.C. power supply, an inductive circuit composed of a saturable inductance and a linear inductor in series, a first terminal of said inductive circuit being connected to said commutating SCR cathode, a commutating capacitor connected between said load SCR cathode and a second terminal of said inductive circuit, means to charge said commutating capacitor and a rectifier connected in parallel with said load SCR with its anode connected to said load SCR cathode;

(d) a trigger circuit including a third power supply connected to said commutating circuit, said trigger circuit comprising:
   (1) a resistor and a trigger capacitor in series and adapted to be energized by a third D.C. power supply to charge said trigger capacitor,
   (2) a transformer having a primary and a secondary,
   (3) a trigger SCR connected in series with said primary to provide a discharge path for said trigger capacitor, said trigger SCR having a gate, a cathode and an anode,
   (4) a transistor having a base, a collector and an emitter,
   (5) a variable voltage divider connecting said emitter to a first terminal of the third D.C. power supply,
   (6) a second resistor connecting said collector to a second terminal of the third D.C. power supply,
   (7) said trigger SCR gate being connected to said voltage divider so that conduction by said transistor causes said trigger SCR to fire and discharge said trigger capacitor through said primary, and
   (8) said secondary being connected to said commutating circuit to actuate said commutating circuit in response to a discharge of said trigger capacitor;

(e) a sensor circuit connected to said base, said sensor circuit including a mutual inductance and a third resistor in parallel, said mutual inductance being disposed adjacent to said superconductive coil to actuate said trigger circuit in response to a current decrease in said superconductive coil; and (f) a dissipation capacitor and a rectifier circuit in parallel with said superconductive coil and poled so as to block current during the superconducting state, and means to charge said dissipation capacitor, said commutating circuit initially conducting current subsequent to the commutation of said load SCR to bias said dissipation capacitor and rectifier circuit to a conducting state so the energy stored in said superconductive coil is transferred to said dissipation capacitor.

References Cited by the Examiner

UNITED STATES PATENTS 3,270,247   8/1966   Rosner  ---------------- 317—13

OTHER REFERENCES

IBM Technical Disclosure Bulletin, "Energy Removal from a Superconducting Solenoid," vol. 6, No. 9, February 1964, p. 67.

References Cited by the Applicant

Field Energy Removal From a Superconducting Solenoid, M. W. Dowley, Cryogenics, June 1964.

Protection of Superconducting Coils, P. R. Smith, Rev. Sci. Instru., vol. 34, April 1963, p. 368.

Silicon Controlled Rectifier Manual prepared by the Rectifier Component Dept., Auburn, N.Y., 3rd edition, 1964.

MILTON O. HIRSHFIELD, *Primary Examiner.*

J. D. TRAMMELL, *Assistant Examiner.*